Figure 1:
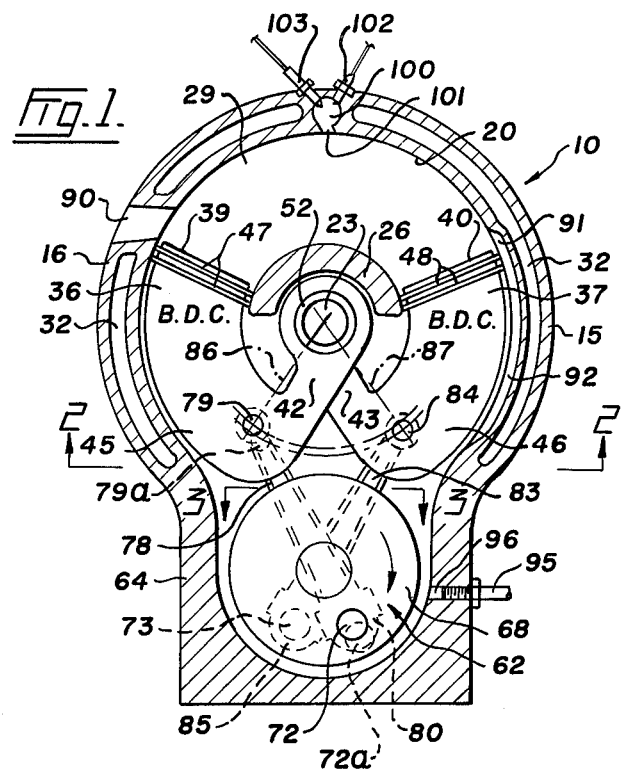

United States Patent [19]
James

[11] 3,910,238
[45] Oct. 7, 1975

[54] PISTON POWER UNIT WITH STRATIFYING IGNITION SYSTEM

[76] Inventor: Richard James, 5025 Granville St., Vancouver, British Columbia, Canada

[22] Filed: June 10, 1974

[21] Appl. No.: 478,169

[52] U.S. Cl. .............................. 123/18 R; 123/32 B
[51] Int. Cl. ............................................. F02b 53/10
[58] Field of Search ..... 123/8.09, 18 R, 18 A, 32 C, 123/32 D, 32 SP, 32 ST, 32 B

[56] References Cited
UNITED STATES PATENTS

| | | | |
|---|---|---|---|
| 1,111,605 | 9/1914 | Moss et al. | 123/18 A |
| 1,318,228 | 10/1919 | Pavia et al. | 123/18 R |
| 3,857,369 | 12/1974 | Sabet | 123/8.13 |

FOREIGN PATENTS OR APPLICATIONS

| | | | |
|---|---|---|---|
| 148,697 | 8/1920 | United Kingdom | 123/18 A |

Primary Examiner—William L. Freeh
Assistant Examiner—Michael Koczo, Jr.
Attorney, Agent, or Firm—Fetherstonhaugh & Co.

[57] ABSTRACT

A piston power unit having curved opposed pistons moving in a correspondingly curved cylinder and driving one or two crankshafts, said cylinder having a fuel intake port and an exhaust port. An ignition chamber is provided in the wall of the cylinder and in communication with the latter through an ignition port, said chamber including a fuel injector and a spark plug. During the compression strokes of the pistons, a lean fuel mixture in the cylinder and the ignition chamber is compressed and while one of the pistons is covering the ignition port, the mixture in the ignition chamber is enriched with fuel by means of the injector and then ignited, the ignition being transmitted to the fuel in the cylinder when the ignition port is uncovered by the piston. One piston uncovers the exhaust port before the other piston uncovers the intake port, said pistons closing the ports at substantially the same time.

16 Claims, 9 Drawing Figures

U.S. Patent   Oct. 7,1975   Sheet 3 of 3   3,910,238

PISTON POWER UNIT WITH STRATIFYING IGNITION SYSTEM

The invention relates to piston power units and in particular to an improvement in the piston power unit described and claimed in U.S. Pat. No. 3,338,137 of the present applicant, and to a method of operating said power unit.

It has long been recognized that in spark ignition engines, the strength of the mixture in the main body of the combustion chamber could be considerably reduced if a richer mixture could be provided in the immediate neighborhood of the ignition plug at the time of ignition. Once a self propagating flame has been established at the point of ignition, it will spread throughout the rest of the combustion chamber despite the fact that the mixture strength may be far weaker than that which is required to sustain combustion in a conventional piston engine. Sir Harry R. Ricardo, an eminent authority on internal combustion engines, states in *High Speed Internal Combustion Engines* at page 15, "It is clear, however, that if, by the use of fuel injection or by other means, we could contrive to provide a richer mixture in the immediate neighbourhood of the ignition plug, we could then afford to reduce very considerably the mixture strength in the main body of the combustion chamber and so extend the mixture range on the weak side, for it is only the mixture strength of that minute portion of the charge which constitutes the initial nucleus and its immediate surroundings that is really critical. Once a self-propagating flame has been established, it will spread throughout the rest of the chamber even though the mean mixture strength be far weaker than that required for the initial nucleus. In other words, if, by stratification, we can contrive to segregate a small proportion of relatively rich mixture in the region of the sparkling-plug, we can weaken the rest much below that which would otherwise be possible. By such means it has been found feasible to operate satisfactorily a two-cycle petrol injection spark-ignition engine with a mean mixture strength of only 60 per cent of that giving complete combustion, so to obtain a very high thermal efficiency."

As can be seen from this quotation, if such a technique is successfully achieved, it will result in lower fuel consumption and higher thermal efficiency in the engine. In addition, much more complete combustion of the fuel will be effected, substantially reducing the output of pollutants in the exhaust gases.

Whilst this objective has long been considered desirable, it has not been possible in conventional piston engines, primarily due to the turbulence which occurs in the fuel mixture during the compression stroke. This has made it impossible to create a stable gas zone in the region of the spark plug at the point of ignition. There are a number of patents covering piston engines having small primary combustion chambers in communication with the engine cylinders, and in which a rich fuel mixture is ignited. However, these have not been successful because of, amongst other things, the turbulence created in the cylinders and, consequently, in the primary combustion chambers. If the piston is closing off the primary combustion chamber at the moment of ignition in said chamber, the compression in the cylinder is at its maximum at this time and, therefore, the compression drops as the piston uncovers the primary chamber. In other words, the compression is greatly reduced at the time of ignition of the fuel charge in the main cylinder so that it is not ignited at the proper compression ratio.

The geometry of the applicant's engine, however, as described in U.S. Pat. No. 3,338,137 is such that suitable modification can be made to provide such a stable gas zone at the point of ignition, and this can be done without affecting the compression ratio.

The present invention is an improvement in a piston power unit having first and second opposed pistons mounted in a curved cylinder for movement towards and away from each other around a centre in compression and power strokes respectively and constrained to move around said centre, each piston having a head at one end thereof facing the opposed piston, an exhaust port and a fuel inlet port near opposite ends of the cylinder and closed by said pistons during compression strokes thereof and uncovered when said pistons nears the ends of their power strokes, and crankshaft means; said improvement comprising an ignition chamber in communication with the cylinder through an ignition port position between said pistons, means in the ignition chamber for directing fuel therein, means in the ignition chamber for igniting said fuel, and connecting means between each piston and said crankshaft means, the location of said ignition port and said connecting means being such that the first piston covers or substantially covers the ignition port at the end of the compression stroke thereof following which the pistons move simultaneously in the same direction until the second piston reaches the end of the compression stroke thereof. Thus, the compression ratio is maintained in the cylinder until the main charge therein is ignited.

A power unit in accordance with this invention comprises a cylinder curved longitudinally about a centre, first and second opposed pistons slidably fitted in the cylinder for movement towards and away from each other during compression and power strokes respectively, each piston having a head at one end thereof facing the opposed piston, means connected to an opposite end of each piston constraining said piston to move about said centre during reciprocation of the piston in the cylinder, an ignition chamber in communication with the interior of the cylinder through an ignition port between said pistons, means in the ignition chamber for injecting fuel therein, means in the ignition chamber for igniting fuel injected therein, said cylinder having an exhaust port and a fuel intake port on opposite sides of the ignition port, and said exhaust port and said intake port being uncovered by the pistons when said pistons near the ends of their power strokes and covering the exhaust and intake ports during their compression strokes, crankshaft means, and a connecting rod for each piston, each connecting rod being pivotally connected at one end to the respective piston and at the other end to said crankshaft means, the location of the ignition port and the movement of said pistons being such that said first piston covers or substantially covers said ignition port at the end of the compression stroke thereof and while said second piston nears the end of the compression stroke thereof, following which said pistons move in the same direction until the second piston reaches the end of the compression stroke thereof.

In the preferred form of this invention, the location of the ignition port of the ignition chamber and the movement of the two pistons are such that the first piston covers or substantially covers said port while the second piston is still moving towards the end of its compression stroke, the pistons remain substantially the same distance apart and move together while the second piston completes its compression stroke and the first piston uncovers the ignition port, and the enriched charge in the ignition chamber is ignited and this in turn ignites the lean change in the chamber. According to this invention the inlet and exhaust ports are located in the cylinder and the movement of the first piston is controlled so that the latter starts to uncover the exhaust port before the second piston starts to uncover the inlet port.

The invention also contemplates a method of operation of a piston power unit of the type referred to above and which comprises directing a lean charge of fuel into the cylinder when the pistons are near the end of the power strokes thereof, moving the pistons through a compression stroke, injecting a rich charge of fuel into an ignition chamber which communicates with the cylinder through an ignition port while said port is covered or partially covered by the first piston near the end of the compression stroke, moving the pistons in the same direction with a space therebetween and containing the compressed lean mixture as the second piston nears the end of its compression stroke, igniting the rich charge in the ignition chamber so as to cause the burning rich charge to ignite the compressed lean charge between the pistons, and starting to exhaust gases from the cylinder before starting to direct a lean charge into the cylinder.

It is preferable to operate said piston power unit by maintaining the pistons spaced substantially the same distance apart while said pistons are moving in the same direction near the end of the compression stroke of the second piston. Furthermore, the first piston is moved so that it uncovers the exhaust port ahead of the second piston uncovering the intake port, and the pistons are moved to close said ports substantially simultaneously.

Figure 2:
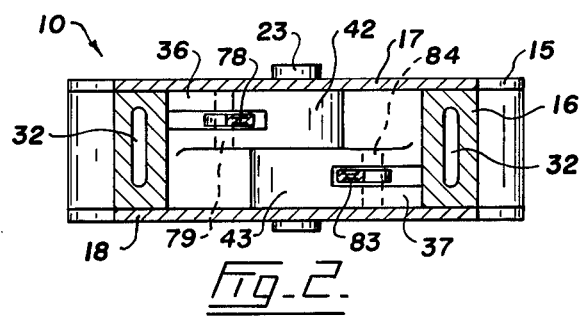
Figure 3:
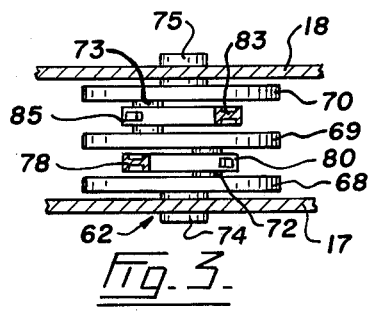
Figure 4:
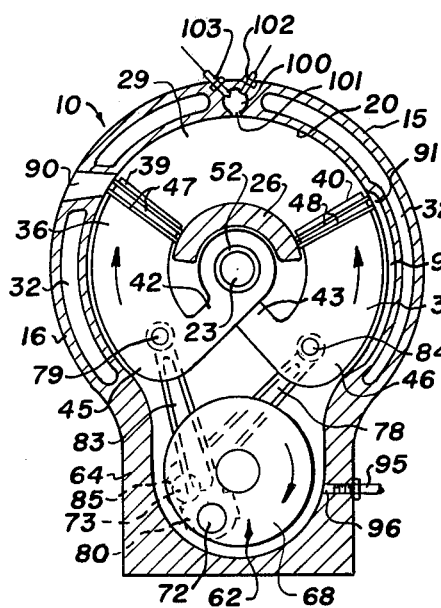
Figure 5:
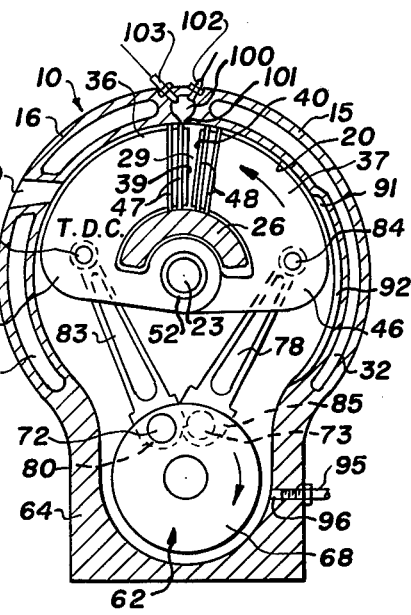
Figure 6:
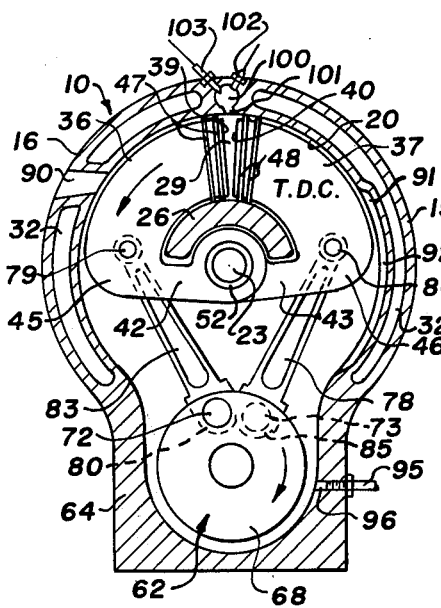
Figure 7:
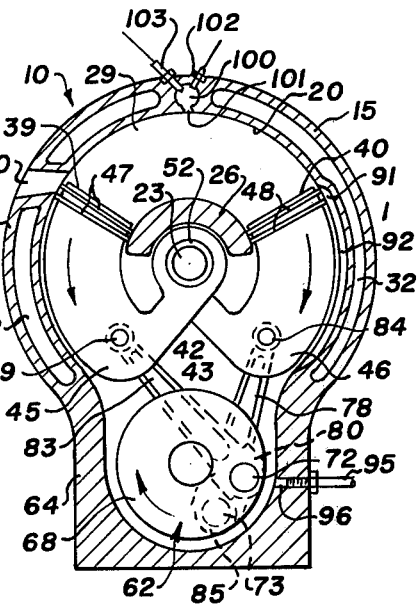
Figure 8:
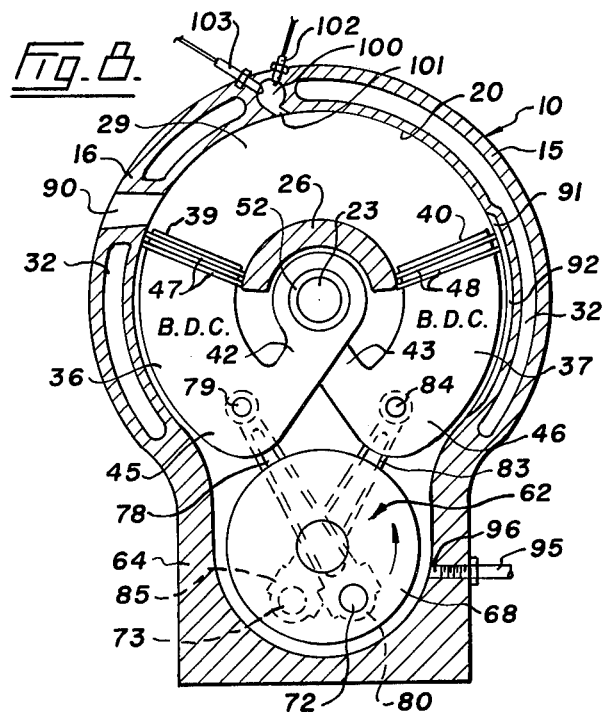
Figure 9:
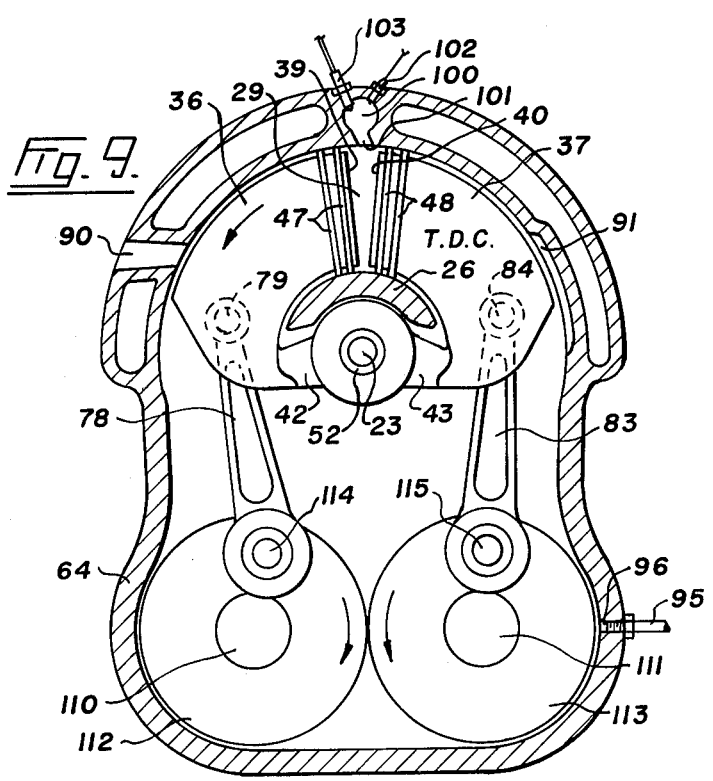

The invention will now be further described with reference to the accompanying drawings in which FIG. 1 is a sectional elevation of a piston power unit according to the invention, showing the pistons at or near the ends of the power strokes thereof, FIG. 2 is a sectional view on the line 2—2 of FIG. 1, FIG. 3 is an enlarged sectional view on the line 3—3 of FIG. 1, FIGS. 4 to 7 are sectional elevations corresponding to FIG. 1 showing various stages in the operating cycle of the unit, FIG. 8 is a sectional elevation of a second embodiment of power unit according to the invention at the stage in the combustion cycle corresponding to FIG. 1, and FIG. 9 is a sectional elevation of a third embodiment of power unit according to the invention at the stage in the combustion cycle corresponding to FIG. 6.

Referring first to FIGS. 1 and 3 of the drawings, 10 is a piston power unit in the form of an internal combustion engine. This unit is generally circular in form and has a casing 15 made up of an annular wall 16 and side walls 17 and 18, either or both of which are removably connected to the annular wall. Wall 16 is formed with a circular inner surface 20 which curves around a fulcrum shaft 23 located centrally and extending transversely of casing 15. The ends of shaft 23 are removably supported by walls 17 and 18.

A curved inner wall 26 is spaced inwardly from the inner surface 20 of casing wall 16 and is concentric therewith and with shaft 23, said inner wall, inner surface 20 of wall 16 and side walls 17 and 18 forming a cylinder 29 which is curved longitudinally around the center or longitudinal axis of shaft 23. In this example, cylinder 29 is rectangular in cross-section, but it is to be understood that casing 15 and inner wall 26 may be shaped so that cylinder 29 has any desired cross-sectional shape, such as round, oval or the like.

If desired, wall 16 and either or both of side walls 17 and 18 of casing 15 may be hollowed to form one or more coolant chambers 32. A cooling fluid such as water, is circulated through chamber or chambers 32 in any convenient manner, not shown.

Opposed longitudinally curved pistons 36 and 37 of the same cross-sectional shape as cylinder 29 are slidably mounted in said cylinder for movement towards and away from each other in compression and power strokes, respectively. Pistons 36 and 37 have heads 39 and 40 at adjacent ends thereof and facing each other. Arms 42 and 43 are fixedly secured to pistons 36 and 37 at the outer or lower ends 45 and 46 thereof. These ends project beyond the ends of inner wall 26 when pistons 36 and 37 are near the ends of their power strokes, see FIG. 5, at which time piston heads 39 and 40 are spaced a little from each other in cylinder 29. The opposite ends of arms 42 and 43 are mounted on shaft 23 and a suitable non-friction bearing 52 is provided for each arm.

Pistons 36 and 37 are adapted to oscillate in cylinder 29, and as said cylinder is concentric with shaft 23, said pistons oscillate around the longitudinal center or axis of the shaft. As arms 42 and 43 are fixedly secured to the pistons and are rotatably connected to shaft 23, these arms constrain the pistons to move along circular paths about the center of the shaft so that there is no side thrust against the walls of the cylinder. Pistons 36 and 37 are provided with one or more piston rings 47 and 48 adjacent their respective heads.

The unit 10 includes a crankshaft 62 partially located in an offset crank case 64 extending from casing 15. The crankshaft 62 is made up of equally spaced discs 68, 69 and 70 interconnected by crank pins 72 and 73 extending respectively between discs 68–69 and 69–70 adjacent the peripheries of said discs, see FIG. 3. Aligned stub shafts 74 and 75 project outwardly from discs 68 and 70 centrally thereof. Pins 72 and 73 and the discs to which they are connected constitute the cranks of crankshaft 62. By referring to FIG. 1, it will be seen that the circumferential spacing of pins 72 and 73 is relatively small so that the cranks or throws of crankshaft 62 are close to each other.

A connecting rod 78 has one end swingably connected by a wrist pin 79 to piston 36 adjacent end 45 thereof and an opposite or big end 80 swingably connected to pin 72, said big end 80 fitting between crank discs 68 and 69. Similarly, a connecting rod 83 has one end swingably connected by a wrist pin 84 to piston 37 adjacent end 46 thereof and an opposite or big end 85 connected to pin 73, the end 85 fitting between crank discs 69 and 70.

In this example, wrist pin 79 is closer to the axis of the shaft 23 than wrist pin 84, these distances being respectively indicated by lines 86 and 87 in FIG. 1. This produces a longer stroke in piston 36 than in piston 37.

When the center of rotation of crankshaft 62, crank pin 72 and wrist pin 79 of connecting rod 78 are aligned, see FIG. 5, piston 36 is at its top dead centre or the end of its compression stroke. Similarly when the center of the crankshaft 62, crank pin 73 and wrist pin 84 of connecting rod 83 are aligned, piston 37 is at its top dead center or the end of its compression stroke. It will be seen that from the arrangement shown, the piston 36 is phased slightly in advance of the piston 37 so that they do not reach the ends of their compression strokes simultaneously, but piston 36 arrives at this position while piston 37 is still approaching it.

The cylinder 29 is provided with an exhaust port 90 within the lower portion of the zone of movement of the piston 36. The cylinder is also provided with an inlet or transfer port 91 at the end of a transfer passage 92 in its wall in the lower portion of the zone of movement of the piston 37, said passage communicating at its opposite end with the base of the engine. A pipe 95 directs air or an air-fuel mixture (depending on the mode of operation of the unit as described below) into the crank case 64 through an opening 96. The downward movement of the pistons 36 and 37 produces an increase in pressure in the crank case which causes the transfer of the air or air-fuel mixture to the cylinder 29 through the transfer passage 92 and inlet port 91.

Substantially midway between the pistons when the latter are at the ends of their power strokes, the cylinder 29 has a spherical ignition chamber 100 formed in the wall thereof, the ignition chamber having a tangential outlet port 101 opening into the cylinder substantially at the vertical centerline of the engine. A spark plug 102 and a fuel injector 103 extend sealingly into the ignition chamber 100, the fuel injector being aligned with the outlet 101 from the chamber.

FIG. 1 shows piston 37 at its bottom dead centre with intake port 91 fully open. It will be noted that the centres of wrist pin 84, crankshaft 62 and crank pin 73 are in line. Similarly, piston 36 is substantially at or just past its bottom dead centre.

Turning now to FIGS. 4 to 7, it is assumed that a lean air-fuel mixture is being provided through the pipe 95. The pistons 36 and 37 have moved into or near their bottom dead center positions during which movement, air-fuel mixture has been transferred through the transfer passage 92 and port 91 into the cylinder 29. As the pistons rise from their lower positions, piston 36 covers the exhaust port 90, see FIG. 4, the exhaust gases having been scavenged by the introduction of the new combustion mixture, and the piston 37 is completing the closure of intake port 91.

As the pistons continue to move upwardly in the cylinder, they compress the lean fuel charge therebetween, and some of this charge enters ignition chamber 100. However, as piston 36 reaches the end of its compression stroke while piston 37 is still moving towards the end of its compression stroke, piston 36 has covered or closed ignition port 101, see FIG. 5. Although it is preferable to completely close said port, the movement of piston 36 may be such that it almost closes the ignition port. The purpose is to completely or partially isolate the ignition chamber from the cylinder at this time. The fuel injector 103 is now operated to enrich the mixture in the ignition chamber in the vicinity of the spark plug 102.

At the optimum time, the charge in the ignition chamber is fired by spark plug 102. Piston 36 uncovers ignition port 101 substantially at the same time as this ignition takes place. This is timed just as or an instant before piston 37 reaches the end of its compression stroke, as is customary in piston engines, see FIG. 6. It will be noted that the space between the heads of the two pistons remains substantially the same as piston 37 moves to its top dead center and piston 36 uncovers port 101 so that the compression ratio is not interferred with even though the one piston is approaching its top dead center and the other is moving away from its top dead center. The flame produced in the ignition chamber propagates through port 101 into the compressed weaker mixture between the piston heads 39 and 40. The ignition of the weak mixture takes place while the compression thereof is at its highest point. This ignition produces a power stroke in both pistons which move downwardly as shown in FIG. 7. With this arrangement, the mixture introduced through intake ports 91 can be much weaker than would be essential to start and sustain combustion in a conventional piston engine. In addition, the fact that ignition port 101 is closed or substantially closed when the enriched mixture is directed into chamber 100, the mixture in this chamber is contained separate from the main cylinder until it is ignited. As a result of this arrangement, there is an increased thermal efficiency, the compression ration is not affected, a substantial saving in fuel, and more complete combustion which results in cleaner exhaust gases.

Another advantage of the present power unit or engine lies in the fact that exhaust port 90 can be located so that piston 36 starts to uncover it before piston 37 starts to uncover intake port 91, as shown in FIG. 7. Thus, the gases are being exhausted from the cylinder through port 90 when intake port 91 is opened. As the two ports are on opposite sides of the vertical centerline of the engine, the incoming fuel charge drives the exhaust gases without intermixing ahead of it out of the cylinder. The crank pins 72 and 73 of crankshaft 62 are located so that the movement of the pistons is such that the pistons close the exhaust and intake ports at substantially the same time. This allows the fuel charge to be controlled so that none of it flows out through the open exhaust port, and yet practically all of the exhaust gases are expelled from the cylinder.

The longer stroke of piston 36 relative to the stroke of piston 37 can be accomplished in several different ways. As stated above, wrist pin 79 can be closer to the axis of shaft 73 than wrist pin 84, as shown. Alternatively, the distance between piston head 39 and the wrist pin 79a, shown in broken lines in FIG. 1, may be greater than the distance between piston head 40 and wrist pin 84. Another way of accomplishing this is to make the throw of the crank connected to piston 36 greater than that of the crank connected to piston 37. In FIG. 1, a crank pin 72a is shown in broken lines to illustrate this arrangement.

The unit above described may also be operated in a slightly modified manner with air only being provided through the pipe 95. This air could also be provided directly to the intake port 91 by a blower. In this case, the exhaust gases are scavenged from the cylinder by this air. Then after the exhaust and intake ports 90 and 91 have been covered by the upward movement of the pistons, the fuel injector 103 is operated to inject fuel through the outlet 101 into the cylinder 29 to create a lean fuel mixture therein. The cycle then proceeds as previously described with the injector 103 being actuated a second time to enrich the mixture in the ignition chamber 100 when the piston 36 has reached its top dead center position. This method of operation has the advantage of eliminating the loss of fuel during scavenging, since the fuel is not introduced into the cylinder until after the exhaust port 90 has been covered.

FIG. 8 shows a second embodiment which is generally similar in its configuration to the embodiment of FIG. 1, and corresponding features are identified by the same reference numerals. In this embodiment however, the two pistons 36 and 37 are of the same axial length from their wrist pins to faces, wrist pins 79 and 84 are on the same curved center line, crank pins 72 and 73 an equidistant from the center of crankshaft 62, and the combustion chamber 100 is offset to the left along the cylinder bore as seen in this Figure. The operation of this engine is the same as in the embodiment of FIG. 1.

FIG. 9 shows an embodiment which is substantially identical in its configuration at the upper end to the embodiment of FIG. 1, and corresponding features are identified by the same reference numerals. In this embodiment, however, the crank case 64 is enlarged to accommodate two crank shafts 110 and 111. The crank shafts 110 and 111 each carry interengaging gears 112 and 113 so as to provide a unified drive from one of them through the crank case 64. The crankshafts 110 and 111 carry crank pins 114 and 115 respectively to which the lower ends of the connecting rods 78 and 83 are pivotally connected. The movement of piston 36 relative to that of piston 37 is controlled in the same manner as in the embodiment of FIG. 1. The only difference is that the cranks of the two pistons of FIG. 9 are in two separate crankshafts which are operatively connected together by gears 112 and 113, whereas in FIG. 1, they are in a single crankshaft. The operating cycle is identical to that described above with reference to FIGS. 4 to 7. If desired, the throw of crank 114 can be greater than that of crank 115 in order to move piston 36 in advance of piston 37.

I claim:

1. In a piston power unit having first and second opposed pistons mounted in a curved cylinder for movement towards and away from each other around a center in compression and power strokes respectively and constrained to move around said centre, each piston having a head at one end thereof facing the opposed piston, an exhaust port and a fuel inlet port closed by said pistons during compression strokes thereof and uncovered when said pistons near the ends of their power strokes, and crankshaft means; an improvement comprising an ignition chamber in communication with the cylinder through an ignition port positioned between said pistons, connecting means between each piston and said crankshaft means, the location of said ignition port and said connecting means being such that the first piston covers or substantially covers the ignition port at the end of the compression stroke thereof following which the pistons move in the same direction until the second piston reaches the end of the compression stroke thereof, means in the ignition chamber for injecting fuel therein while said port is covered or partially covered by the first piston near the end of the compression stroke, and means in the ignition chamber for igniting said fuel.

2. A power unit as claimed in claim 1 in which said connecting means is such that said first piston during the power stroke thereof starts to uncover the exhaust port before said second piston starts to uncover the inlet port.

3. A power unit as claimed in claim 1 in which said crankshaft means comprises a crankshaft having two circumferentially spaced cranks, and said connecting means comprises a connecting rod for each piston, each connecting rod being pivotally connected at one end to the respective piston and at an opposite end to one of said cranks, each connecting rod being connected to a different crank from the other rod.

4. A power unit as claimed in claim 3 in which each connecting rod is connected to its respective piston by a wrist pin, and the wrist pin of the first piston being spaced farther from the head of said first piston than the spacing of the wrist pin of the second piston from the head of the latter piston.

5. A power unit as claimed in claim 3 in which each connecting rod is connected to its respective piston by a wrist pin, and the wrist pin of the first piston being closer to said centre than the wrist pin of the second piston.

6. A power unit as claimed in claim 3 in which the throw of the crank to which the connecting rod of the first piston is connected is greater than the throw of the crank to which the second piston is connected.

7. A power unit as claimed in claim 1 in which said crankshaft means comprises first and second crankshafts, interconnecting means for the crankshafts to cause said crankshafts to rotate together, and said connecting means comprises a connecting rod for each piston, each connecting rod being pivotally connected at one end to the respective piston and at an opposite end to one of said crankshafts, each connecting rod being connected to a different crankshaft from the other rod.

8. A piston power unit as claimed in claim 1, wherein said ignition chamber is substantially spherical, and said ignition port is a tangential outlet to the cylinder convergent with the cylinder axis in the direction of movement of the first piston during the compression stroke thereof.

9. A piston power unit as claimed in claim 8, wherein said fuel injecting means is axially aligned with said tangential outlet.

10. A piston power unit as claimed in claim 1, wherein said igniting means comprises a spark plug.

11. A piston power unit as claimed in claim 1, wherein said ignition chamber communicates with the cylinder at a position substantially equidistant from both ends of the cylinder, and wherein each connecting rod is connected to its respective piston by a wrist pin, and the wrist pin of the first piston being spaced farther from the head of said first piston than the spacing of the wrist pin of the second piston from the head of the latter piston, whereby when the second piston is at the end of its compression stroke, the piston heads are substantially equidistant from the position at which the ignition chamber communicates with the cylinder.

12. A piston power unit as claimed in claim 1, wherein said ignition chamber communicates with the cylinder at a position offset from the cylinder center towards the first piston, and wherein said first and second pistons are of equal length.

13. A piston power unit as claimed in claim 1, and comprising a sealed crankcase enclosing said crankshaft means, said crankcase having an inlet for fuel vapour and passage means connected to said inlet port whereby, upon pressurization of the crankcase during downward movement of the pistons, fuel vapour is pumped from the crankcase to the cylinder.

14. The method in the operation of a piston power unit of the type having first and second pistons connected to crankshaft means and mounted in a curved cylinder for movement towards and away from each other in compression and power strokes respectively, which comprises directing a lean charge of fuel into the cylinder when the pistons are near the end of the power strokes thereof, moving the pistons through a compression stroke, injecting a rich charge of fuel into an ignition chamber which communicates with the cylinder through an ignition port while said port is covered or partially covered by the first piston near the end of the compression stroke, moving the pistons in the same direction with a space therebetween and containing the compressed lean mixture as the second piston nears the end of its compression stroke, igniting the rich charge in the ignition chamber so as to cause the burning rich charge to ignite the compressed lean charge between the pistons, and exhausting gases from the cylinder as the first piston near the end of the power stroke.

15. The method as claimed in claim 14 which comprises maintaining said pistons spaced substantially the same distance apart while the pistons are moving in the same direction near the end of the compression stroke of the second piston.

16. The method as claimed in claim 14 which comprises starting to exhaust the gases from the cylinder before starting to direct a lean charge into the cylinder.

* * * * *